Figure 1:
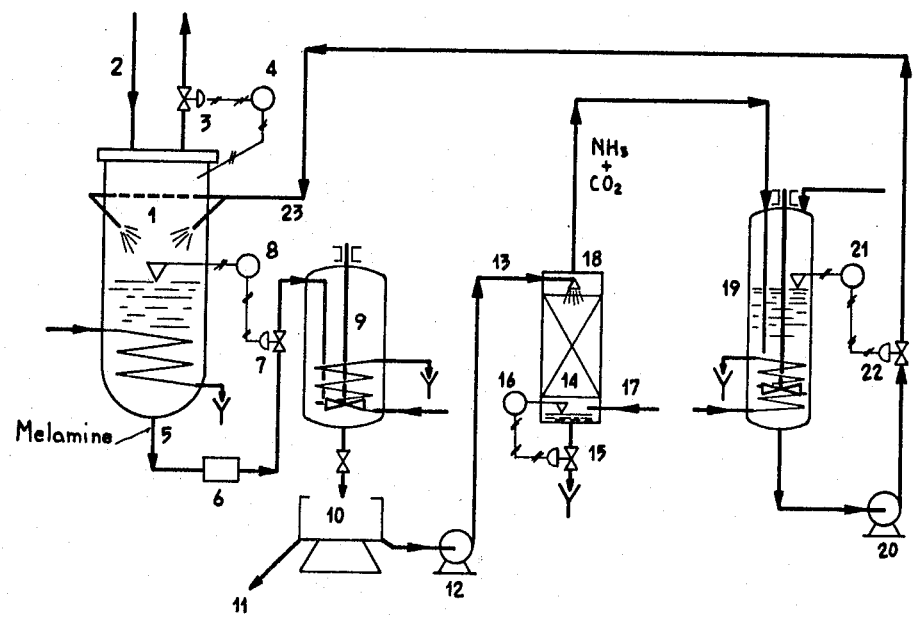

May 5, 1964   M. FOGAGNOLO ET AL   3,132,143
PROCESS FOR RECOVERING MELAMINE
Filed July 9, 1962   3 Sheets-Sheet 1

1- Quenching apparatus
9- Crystallizer
14- Stripping column 3,132,143
PROCESS FOR RECOVERING MELAMINE
Mario Fogagnolo, Milan, Giuseppe Rinaudo, Turin, Enrico Bondi, Legnano, Umberto Soldano, Milan, and Massimo Tardani, Busto Arsizio, Italy, assignors to Montecatini Società Generale per l'Industria Mineraria e Chimica, Milan, Italy, a corporation of Italy
Filed July 9, 1962, Ser. No. 208,415
Claims priority, application Italy Dec. 1, 1961
12 Claims. (Cl. 260—249.7)

This invention relates to a process for recovering melamine, particularly melamine obtained by pyrolysis of urea under pressure. In particular, the present invention provides a simplified industrial process for obtaining melamine having a purity above 99%, starting from crude melamine obtained by pyrolysis of urea under pressure at high temperature.

It is known that when melamine prepared from urea at high pressure and temperature is expanded to normal pressure it undergoes degradation, with formation of several impurities i.e. melam, melem, melon, and isotriazine which, as is known, may be separated from the main product only with very great difficulty.

By employing the process of the instant invention, the decomposition of melamine is reduced in comparison with the decomposition generally occurring upon the direct expansion under normal pressure. Furthermore, the by-products which are separated with difficulty from the main product, are contemporaneously transformed in the expansion apparatus into easily removable products.

It is known that the byproducts deriving from the degradation of melamine are separated from it with difficulty. However, it is now also known that they may be transformed into other products which can be separated more easily by the action of aqueous solutions of alkalies or ammonia thereon, under pressure and at temperatures above 100° C.

The instant invention is based upon the surprising discovery that the transformation of said byproducts is advantageously carried out in the presence of high concentrations of carbon dioxide (5–10% by weight of the solution) besides, or in addition to, ammonia and water, i.e. in the presence of ammonium carbonate or ammonium carbamate.

The importance of this discovery becomes evident when we take into account the cycle involved in the production of melamine from urea.

Urea, as is known, is transformed into melamine according to the following reaction:

$$6NH_2-CO-NH_2 \rightarrow melamine + 6NH_3 + 3CO_2$$

from which it is evident that only 50% of the urea is transformed into melamine, the other 50% being converted to ammonia and carbon dioxide, ideally.

The gaseous mixture obtained from the reaction described above is in the exact stoichiometric proportions suited for use in synthesis of urea, which is a definite economic advantage in cyclic production of melamine.

In a cyclic process, in which said gases are reused in the synthesis of urea, the simplest procedure is to recover and absorb them, after they are separated from melamine, in the same solution of ammonia or carbon dioxide that is recycled to the synthesis urea plant.

In order to achieve this, it is necessary that the ammonia and carbon dioxide gases be made available from the melamine plant at a pressure of about 5 atm. at the end of the quenching phase.

The quenching of the reaction mixture under pressure is carried out with saturated solutions of ammonia and carbon dioxide, so that degradation of the melamine which it is discharging from the reactors is reduced to a remarkable degree or is completely avoided.

The present invention is an improved process for recovering melamine obtained by pyrolysis of urea under pressure. The invention is characterized by the fact that the molten mixture coming out of the reactor, which mixture contains the melamine, is quenched, after expansion to a pressure higher than atmospheric pressure, the quenching being carried out with an aqueous recycling solution (A), saturated with ammonia and carbon dioxide and with their reaction products such as ammonium carbonate and ammonium carbamate, the contacting being carried out at a temperature of from 100 to 200° C. for 10–60 minutes. The melamine solution obtained after said period of time is filtered, the insoluble products being removed, after which the melamine solution is cooled to crystallize out the melamine, preferably at an atmospheric pressure, the chilled solution being centrifuged to separate crystals having a high content of pure melamine. The mother liquors are subjected to a current of steam at low pressure to remove the carbon dioxide and ammonia, and their reaction products, contained in said mother liquors. The condensed and cooled vapors are recycled to the quenching stage as solution (A).

The impurities, which originally were present with the melamine, remain dissolved and/or suspended in the mother liquors.

The preferred operating conditions are as follows.

Pressure of the mixture leaving the reactor: from 60 to 100 atm.;
Quenching pressure: from 5 to 95 atm., preferably from 10 to 35 atm.;
Quenching temperature: from 120° to 170° C.;
Staying time under the above-mentioned conditions of pressure and temperature: from 20 to 50 minutes;
Concentration of melamine in the solution 5–20%: preferably from 8 to 15%.

Under said conditions it is possible to transform the undesirable byproducts (which byproducts can be separated from melamine only with difficulty) into other products that are soluble in alkalies, such as ammeline and ammelide.

The reaction gases which cannot be dissolved in the mother liquors, which is already saturated with them, are sent, by means of an automatic valve, to the plant for the synthesis of urea.

The process of the present invention therefore couples the economic advantage deriving from the reuse of the ammonia and carbon dioxide, for synthesis of urea, with the advantage of obtaining pure melamine having a titer higher than 99%, without resorting to difficult purification processes.

Many variants may obviously be introduced into the above process without departing from the scope of the present invention. Thus, for example, the applicants have noted that, if the melamine solution coming from the quenching phase is treated in countercurrent with gaseous ammonia, in a stripping stage under pressure and temperature conditions similar to those of the quenching, so that the dissolved carbon dioxide is removed, and thus producing a saturated solution containing only ammonia (2–30%, preferably 5–20% ammonia), then, upon filtration and crystallization, crystals having a high content of melamine can be obtained. In such case, the liquors saturated with ammonia may be recycled as such, upon their discharge from the quenching column. The ammonia and carbon dioxide gases liberated in the stripping zone may be sent to the urea plant.

In a second embodiment, the mother liquors which are saturated with ammonia can be treated with carbon dioxide, for example bubbling into them a gaseous stream of ammonia and carbon dioxide coming from the stripping zone and from the quenching solution. Carbon dioxide precipitates the hydroxylated byproducts present in the ammoniacal solution, by lowering the solubility of said products, and thus facilitates removal of said byproducts by filtration. This obviates the need for discharging solution (A) from the recycling solution which would lead to a loss of usable product.

A further variant of the process comprises treating the melamine solution, obtained from the quenching, in countercurrent with vapor so as to remove the ammonia and the carbon dioxide present. The ammonia and carbon dioxide may then be cooled and condensed to obtain solution (A), which is recycled.

The vapor treatment is carried out preferably in a pressure range from 1 to 6 atm. in the ratio of 0.15 to 0.30 kg. of vapor, preferably 0.25 kg. per kg. of solution coming out of the quenching stage. In such case, a solution or a slurry of melamine is obtained, which is free from $NH_3$ and $CO_2$ and which may then be treated with an alkaline solution according to processes commonly used to purify melamine.

When a stainless steel apparatus (18% chrome, 11% nickel and 3% molybdenum) is used, and if small amounts of molecular oxygen are blown into the quenching tower, a further increase in the degree of purity of the melamine is obtained.

The above objects and purposes are realized by employing any one of the three process schemes described hereinafter and illustrated in FIGS. 1, 2, and 3, which describe continuously operated cyclic processes.

They are presented as follows:

CYCLE 1

[This cyclic process is illustrated in FIG. 1]

After the melamine leaves the urea pyroylsis vessel (not shown), it is introduced into the quenching apparatus 1 through pipe 2. The melamine solution leaves apparatus 1 through pipe 5, is filtered at 6, passes through float-controlled valve 7, and is then expanded and cooled in crystallizer tank 9 to crystallize the melamine.

The melamine is separated from the mother liquors in centrifuge 10, the crystals being removed at 11. The mother liquors and washing liquors are sent through the pump 12 and conduit 13 to the head of a stripping column 14 into the bottom of which steam is blown at 17. The ammonia and carbon dioxide evolve at the head of the column 14, being removed through conduit 18 and absorbed again in water in apparatus 19. A solution saturated with ammonia and carbon dioxide is recycled through pipe 23 to the quenching column, by pump 20.

From the bottom of stripping column 14, a suspension 15 consisting of ammeline and ammelide is collected, which suspension may be further treated, for recovery of said byproducts.

The loss of melamine in the discharge at 3 is comparatively small due to the high melamine concentration in the solution coming out of the quenching apparatus 1 at 5.

The operating conditions for apparatus 14 and 19 are as follows:

The pressure is from 1 to 20 atm., preferring the range from 1 to 5 atm., the temperatures corresponding. It is noted that while low pressure facilitates the stripping action, higher pressure permits attainment of a higher reflux temperature for the mother liquors recycled at 23. In consequence of this there is a steam saving.

CYCLE 2

Figure 2:
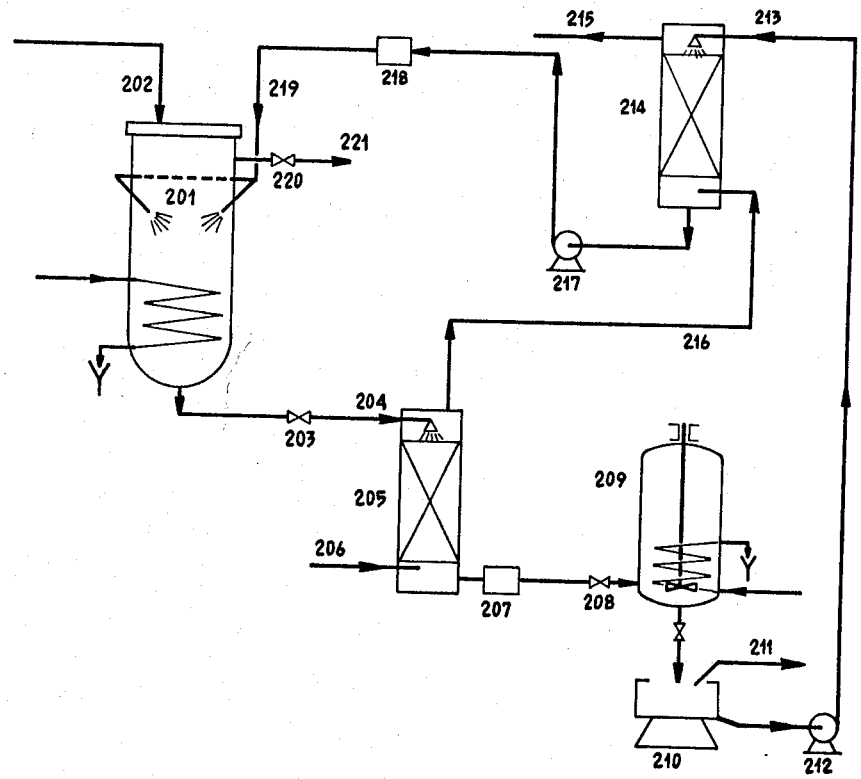

[This cyclic process is illustrated in FIG. 2]

In this embodiment the carbon dioxide is removed before the crystallization, by stripping with ammonia. The subsequent crystallization of the melamine is carried out in the presence of ammonia solely in order to keep the hydroxylated byproducts in the solution.

The melamine solution leaving the quenching apparatus 201 is passed through pipe 204 to the head of stripping column 205, which is kept under the same pressure or under a pressure lower than that of the quenching stage. Ammonia is blown in at 206 to remove the dissolved carbon dioxide. A gaseous mixture consisting of ammonia, carbon dioxide and steam is removed at the head of the column, through pipe 216. A slurry of melamine in water and ammonia is discharged from the bottom of the column, and is then filtered at 207, expanded through valve 208, and crystallized by cooling in the apparatus 209. The slurry is centrifuged at 210, the mother liquors containing ammonia being again placed under compression, by pump 212, and sent through pipe 213 to the adsorption apparatus 214, to remove $NH_3$, $CO_2$ and steam which were liberated from the head of the stripping column 205.

Because of the $CO_2$ dissolved therein, the oxyaminotriazines that are present in the mother liquors recovered from the centrifuge, precipitate, said oxyaminotriazines being removed by filtration, at 218.

By suitable regulation of the pressure and temperature in apparatus 214, it is possible to obtain, at the bottom, a solution saturated with ammonia and carbon dioxide, which after filtration at 218 under stripping conditions, is recycled at 219. At the head of column 214 pure ammonia is removed at 215, and is then recycled to the stripping column 205.

The apparatuses 205 and 214 may be operated at temperature varying between 100° and 200° C., preferably between 120°–170° C. The ammonia concentrations therein range from 2–30%, the preferred concentrations being between 5 and 20%.

The operating temperature is selected in correlation with the pressure and the percent of dissolved ammonia.

CYCLE 3

Figure 3:
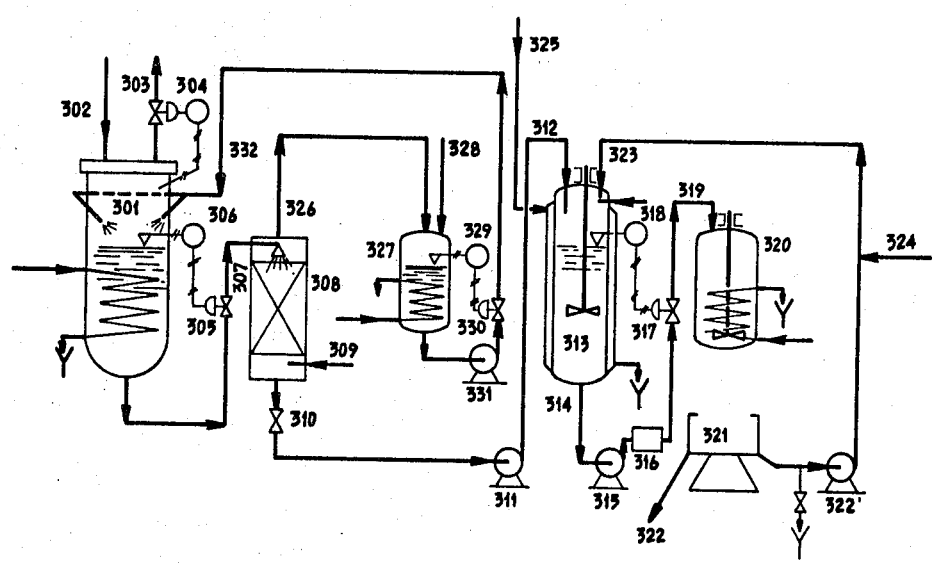

[This cyclic process is illustrated in FIG. 3]

The melamine pulp leaving quenching apparatus 301 is expanded at 305 and sent to stripping column 308 which is supplied with steam at 309, to remove the ammonia and carbon dioxide.

A mixture of ammonia, carbon dioxide and water evolved at the head of the stripping column is passed through pipe 326 to apparatus 327 to be absorbed again with water, and is then sent back to the quenching apparatus. The slurry discharged from the bottom of the column at 310 is sent to a dissolver 313 to which the alkaline mother liquors containing NaOH are recycled at 323 in a specified amount to produce a melamine solution saturated at 100° C.

The alkaline melamine solution leaving at 314 is filtered in apparatus 316, at 100° C., and is then sent to a crystallizer 320. The melamine is separated from the alkaline mother liquors by centrifuging at 321. The mother liquors are recycled to the dissolving apparatus after a suitable purification treatment, and after restoration or replenishing of the NaOH.

The apparatuses 308 and 327 can be operated in pressure ranges between 1 atm. and the quenching pressure, the pressure range between 1 and 6 atm. being preferred.

The NaOH percentage in the recycling mother liquors recycled at 323 varies between 0.1 and 0.4%.

As for utilizable construction materials, the mixture consisting of water, ammonia, carbon dioxide and melamine is very corrosive, when heated at temperatures higher than 100° C., the commonly used stainless steels being rapidly corroded thereby. However, the addition of small percentages of oxygen or air to the above-mentioned solutions is enough to prevent corrosion.

More expensive materials, such as Ti, Ta, Zr, Ag, withstand this corrosive medium very well, even in the absence of $O_2$.

The following examples are illustrative only and are not intended as limitative, since the working conditions may be varied within sufficiently or adequately wide ranges, as was stated above. The composition, pressure, and temperature of the mixture of melamine, ammonia and carbon dioxide leaving the reactor can also be varied.

In the following descriptions reference will be made to the plant diagrams described above.

Example 1

[Reference is made to FIG. 1]

A mixture of $NH_3$, $CO_2$ and molten melamine coming through pipe 2 from a reactor (not shown), at 380° C. and 100 atm., and having the following composition (by weight): $NH_3=46\%$; $CO_2=28\%$; melamine=26%, is expanded to 20 atm. in the apparatus 1, and is then washed with an aqueous solution fed in at 23, containing 20% ammonia and 6% $CO_2$ in the proportion of 8.0 kg. solution to one kg. melamine.

The melamine solution collected at the bottom of the column 1 is heated to 150° C. and left to stay for 30 minutes.

Under these conditions, the entire quantity of ammonia and carbon dioxide which accompanied the molten melamine is recovered and discharged from the upper part of the stripping column through a system 3, 4 for automatic regulation of the pressure. The melamine solution 5 is filtered at 6, expanded through valve 7, and cooled in crystallizer 9.

From the centrifuge 10, melamine 11 having the following characteristics is removed:

| | Percent by weight |
|---|---|
| Melamine content | 99.1 |
| Insoluble in water | 0.3 |
| Isotriazine | 0.6 |

The mother liquors 13 containing $NH_3$ and $CO_2$ are fed in at the head of the stripping column 14, where $NH_3$ and $CO_2$ are removed by blowing in steam at 17, at atmospheric pressure and 100° C., and then absorbed again in water at 30° C. in the apparatus 19, thus obtaining a solution having the composition described above, for the mother liquors of the molten melamine.

Solution 23 is recycled to the quenching by pump 20, through an automatic system 21, 22 for regulation of the level.

The content of melamine is determined in each case by potentiometric titration with $H_2SO_4$, according to Dochlemann (Angew. Chem. 66 (1956), n. 19,606). The percent of isotriazine is determined by ultraviolet adsorption.

Example 2

[Reference is made to FIG. 2]

A mixture, at 202, consisting of $NH_3$, $CO_2$ and molten melamine, coming at 380° C. and 100 atm. from the reactor (not shown), and having the same composition as was described in Example 1, is expanded to 15 atm. and washed with an aqueous solution introduced at 219, containing 8.0% $NH_3$ and 2.0% $CO_2$ and saturated with melamine at 25° C., in the proportion of 7 kg. solution to one kg. molten melamine.

The melamine slurry is collected on the bottom of the quenching column 201, and is heated at 170° C., and kept under these conditions for 20 minutes.

Also, the mixture, at 221, of $NH_3$ and $CO_2$ which accompanied the molten melamine, is removed from the head of the column through valve 220. The melamine solution 204 is sent to stripping column 205 filled with Rashig rings, and kept under the same pressure and temperature conditions as the quenching apparatus.

Ammonia is blown into the bottom of the stripping column, at 206, in a ratio of 0.1 kg. to one kg. solution.

The ammoniacal solution of melamine which is collected free of carbon dioxide at the bottom of the column is filtered at 207, expanded at 208, and cooled at 209, to crystallize out the melamine.

Under plant operating conditions, the melamine discharged from the centrifuge 210, at 211, has the following characteristics:

| | Percent by weight |
|---|---|
| Melamine content | 99.2 |
| Insoluble in water | 0.3 |
| Isotriazines | 0.5 |

The ammonia mother liquors are recycled at 213 to the absorption tower 214 by pump 212, at 15 atm., to chemically unite with the carbon dioxide coming through pipe 216 from the stripping column 205, by reaction with the ammonia dissolved in the mother liquors. From the bottom of the column a solution is obtained of ammonia and carbon dioxide containing in suspension the oxyamino triazines precipitated from the ammonia mother liquors by the action of $CO_2$.

The solution saturated with ammonia and carbon dioxide is filtered at 218 to remove these byproducts, and is then returned at 219 to the quenching. The ammonia collected at the head of the column 14 is again sent to the stripping column 6 by means of a blower (not shown) connected to pipe 215.

Example 3

[Reference is made to FIG. 3]

The mixture, at 302, of ammonia, carbon dioxide and molten melamine coming from the reactor (not shown), under the same conditions and with the same composition as that described in the foregoing examples, is expanded to 30 atm. and quenched with an aqueous solution 332 of ammonia and carbon dioxide containing 25% $NH_3$ and 8% $CO_2$ in a ratio of 9 kg. solution to one kg. melamine.

The melamine slurry is collected at the bottom of the quenching column 301, heated at 150° C. and left to stay for 60 minutes.

The gases that originally come from the reactor, together with the molten melamine, are removed from the head of the column through the automatic system 303, 304 for controlling the pressure.

The melamine solution is expanded under atmospheric pressure through the valve 305 and sent to a stripping column 308 at the bottom of which steam is blown in at 309 at a ratio of 0.25 kg. to one slurry, to remove the ammonia and the dissolved carbon dioxide.

From the bottom of the column 308 a slurry free from $NH_3$ and $CO_2$ is obtained, which is discharged at 312 into dissolving apparatus 313, being dissolved together with alkaline mother liquors recycled at 323, saturated with melamine at 25° C. and containing 0.2% NaOH, until a saturated solution at 100° C. is obtained containing almost about 5% melamine.

The solution removed at 314 is filtered in apparatus 316 at 100° C. and sent to a crystallizer 320 where it is cooled to 25° C.

The melamine separated by centrifuge 321 is removed at 322 and washed with 1.5 times its weight of water.

Under plant operating conditions, the crystal has the following characteristics:

| | Percent |
|---|---|
| Melamine content | 99.0 |
| Insoluble in water | 0.2 |
| Isotriazines | 0.7 |

The mother liquors together with the washing liquors introduced at 324, purified and restored to 20% content of NaOH, are recycled to the dissolving apparatus 313. The mixture 326 of ammonia and carbon dioxide and water coming from the stripping column 308 is absorbed in water in apparatus 327. A saturated solution 332 of ammonia and carbon dioxide is obtained which is recycled to the quenching column.

Example 4

The quenching apparatus is of stainless steel and is operated under the following conditions:

| | | |
|---|---|---|
| Pressure | atm | 20 |
| NH₃ | percent | 20 |
| CO₂ | do | 6 |
| Melamine | do | 10 |
| Temperature | °C | 150 |
| Staying time | minutes | 30 |

The melamine solution is discharged from the quenching apparatus and is crystallized by cooling. Thus, a crystalline product is obtained which upon analysis has a 0.20–0.3% ash content consisting of 80–90% $Fe_2O_3$.

According to a preferred alternative embodiment of the invention, into the same quenching apparatus maintained under the preceding reaction conditions, oxygen is blown in the ratio of 0.012:1 at 20 atm. per liter of solution, resulting in a crystalline product, containing from 0.01 to 0.005% ash.

We claim:

1. In a process of making melamine by pyrolysis of urea under heat and pressure, in which a molten mixture containing melamine is removed from the pyrolysis, the molten mixture containing at least one of the following impurities: melam, melem, melon and isotriazine, in combination therewith, an improvement in the process of recovering said melamine, namely: removing the molten mixture under pressure from the pyrolysis, releasing the pressure on the molten mixture to a lower pressure which is higher than atmosphere and quenching said molten mixture with water saturated with ammonia and carbon dioxide and reaction products of ammonia and carbon dioxide, at a temperature of from 100° to 200° C. for 10 to 60 minutes, separating insoluble products, cooling the liquor under atmospheric pressure to crystallize out crystals predominantly consisting of melamine, recovering the crystals from the mother liquors, subjecting the mother liquors of the crystallization to a stream of water vapor to strip ammonia, carbon dioxide, and reaction products of ammonia and carbon dioxide, condensing the vapors, and passing the aqueous condensate to the quenching stage to quench the molten mixture.

2. The process according to claim 1, in which the melamine solution obtained from the quenching is treated under the same temperature and pressure conditions with ammonia, in the proportion of about 0.1 kg. NH₃ per one kg. solution and the pure melamine is crystallized from the ammonia solution free from carbon dioxide, and in which the pure melamine is crystallized from an ammonia solution free from carbon dioxide having a concentration by weight from 2 to 30% by weight NH₃.

3. The process according to claim 1, in which molecular oxygen is blown into the quenching zone to diminish corrosion.

4. A process for recovering melamine from a melamine reactor pyrolyzing urea under pressure, which comprises removing the molten mixture produced in the melamine reactor at a pressure from 60 to 100 atmospheres, expanding the molten mixture to a pressure between 5 and 95 atmospheres and quenching said molten mixture with water saturated with ammonia and carbon dioxide and the reaction products thereof, at a temperature from 120° and 170° C. for a period from 20 to 50 minutes, the melamine concentration being from 5 to 20%, separating insoluble products, cooling the liquor to crystallize out crystals predominantly consisting of purified melamine, subjecting the mother liquors of the crystallization to a stream of water vapor to strip therefrom ammonia, carbon dioxide, and reaction products of ammonia and carbon dioxide, condensing the vapors, and utilizing the aqueous condensate in the quenching stage to quench the molten mixture removed from the pyrolysis.

5. A process for recovering melamine from a melamine reactor pyrolyzing urea under pressure, which comprises removing the molten mixture produced in the melamine reactor at a pressure from 60 to 100 atmosphees, expanding the molten mixture to a pressure between 10 and 35 atmospheres and quenching said molten mixture with water saturated with ammonia and carbon dioxide and the reaction products thereof, at a temperature from 120° to 170° C. for a period from 20 to 50 minutes, the melamine concentration being from 8 to 15%, separating insoluble products, cooling the liquor to crystallize out crystals predominantly consisting of purified melamine, subjecting the mother liquors of the crystallization to a stream of water vapor to strip therefrom ammonia, carbon dioxide, and reaction products of ammonia and carbon dioxide, condensing the vapors, and utilizing the aqueous condensate in the quenching stage to quench the molten mixture removed from the pyrolysis.

6. A process for recovering melamine from a melamine reactor pyrolyzing urea under pressure which comprises removing the molten mixture produced in the melamine reactor at a pressure of about 100 atm. and having the following composition by weight: NH₃ about 46%, CO₂ about 28% and melamine about 26%, and in which said molten mixture is quenched after expansion to 20 atm. with an aqueous solution containing about 20% NH₃ and 8% CO₂ by weight in a ratio of about 8 kg. solution per one kg. melamine, the slurry obtained being heated to 150° C. and aged for 30 minutes.

7. A process for recovering melamine from a melamine reactor pyrolyzing urea under pressure which comprises removing the molten mixture produced in the melamine reactor at a pressure of about 100 atm. and having the following composition by weight: NH₃ about 46%, CO₂ about 28% and melamine about 26%, and in which said molten mixture is quenched after expansion to 20 atm. with an aqueous solution containing about 20% NH₃ and 8% CO₂ by weight in a ratio of about 8 kg. solution per one kg. melamine, the slurry obtained being heated to 150° C. and aged for 30 minutes, separating insoluble products, cooling the liquor to crystallize out crystals predominantly consisting of purified melamine, subjecting the mother liquors of the crystallization to a stream of water vapor to strip therefrom ammonia, carbon dioxide, and reaction products of ammonia and carbon dioxide, condensing the vapors and utilizing the aqueous condensate in the quenching stage to quench the molten mixture removed from the pyrolysis.

8. A process for recovering melamine from a melamine reactor pyrolyzing urea under pressure which comprises removing the molten mixture produced in the melamine reactor at a pressure of about 100 atm. and having the following composition by weight: NH₃ about 46%, CO₂ about 28% and melamine about 26%, and in which said molten mixture is quenched after expansion to 15 atm., with an aqueous solution containing about 8% NH₃ and 2% CO₂ by weight, which solution is saturated with melamine at 25° C., at a ratio of 7 kg. solution per one kg. molten melamine, and in which the melamine solution is heated to about 170° C. and aged in the quenching column for about 20 minutes.

9. A process for recovering melamine from a melamine reactor pyrolyzing urea under pressure which comprises removing the molten mixture produced in the melamine reactor at a pressure of about 100 atm. and having the following composition by weight: NH₃ about 46%, CO₂ about 28% and melamine about 26%, and in which said molten mixture is quenched after expansion to 15 atm., with an aqueous solution containing about 8% NH₃ and 2% CO₂ by weight, which solution is saturated with melamine at 25° C., at a ratio of 7 kg. solution per one kg. molten melamine, and in which the melamine solution is heated to about 170° C. and aged in the quenching column for about 20 minutes, separating insoluble products, cooling the liquor to crystallize out crystals predominantly consisting of purified melamine, subjecting the mother liquors of the crystallization to a stream of water vapor to strip therefrom ammonia, carbon dioxide, and reaction products of ammonia and carbon dioxide, condensing the vapors, and utilizing the aqueous condensate in the quenching stage to quench the molten mixture removed from the pyrolysis.

10. A process for recovering melamine from a melamine reactor pyrolyzing urea under pressure which comprises removing the molten mixture produced in the melamine reactor at a pressure of about 100 atm. and having the following composition by weight: $NH_3$ about 46%, $CO_2$ about 28% and melamine about 26%, and in which said molten mixture is quenched after expansion to 30 atm., with an aqueous solution containing by weight about 25% ammonia and 8% carbon dioxide, in a ratio of about 9 kg. solution per one kg. melamine, the slurry obtained is heated at about 150° C. and aged in the quenching column for about 60 minutes.

11. A process for recovering melamine from a melamine reactor pyrolyzing urea under pressure which comprises removing the molten mixture produced in the melamine reactor at a pressure of about 100 atm. and having the following composition by weight: $NH_3$ about 46%, $CO_2$ about 28% and melamine about 26%, and in which said molten mixture is quenched after expansion to 30 atm., with an aqueous solution containing by weight about 25% ammonia and 8% carbon dioxide, in a ratio of about 9 kg. solution per one kg. melamine, the slurry obtained is heated at about 150° C. and aged in the quenching column for about 60 minutes, the resulting slurry of melamine, free of ammonia and carbon dioxide, being brought into solution with alkalized mother liquors, which are saturated with melamine and contain about 0.2% by weight NaOH, until a solution saturated with melamine at 100°–130° C. is obtained, and separating the melamine in the pure state, by hot filtration, cooling and centrifuging.

12. A process for recovering melamine from a melamine reactor pyrolyzing urea under pressure which comprises removing the molten mixture produced in the melamine reactor at a pressure of about 100 atm. and having the following composition by weight: $NH_3$ about 46%, $CO_2$ about 28% and melamine about 26%, and in which said molten mixture is quenched after expansion to 20 atm., with an aqueous solution containing by weight 20% $NH_3$ and 6% $CO_2$, the slurry obtained is heated at 150° for 30 minutes.

References Cited in the file of this patent

UNITED STATES PATENTS

| | | |
|---|---|---|
| 2,647,119 | Haworth et al. | July 28, 1953 |
| 2,863,869 | Elmer et al. | Dec. 9, 1958 |

FOREIGN PATENTS

| | | |
|---|---|---|
| 628,250 | Great Britain | Aug. 25, 1949 |
| 628,631 | Great Britain | Sept. 1, 1949 |
| 499,003 | Canada | Jan. 5, 1954 |